June 30, 1931.  T. A. DICKSON  1,811,920
METHOD AND APPARATUS FOR TREATING SOLIDS
Filed Feb. 6, 1928  5 Sheets-Sheet 4
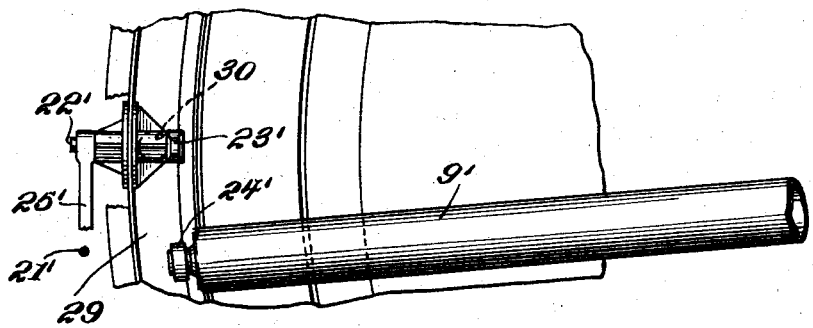
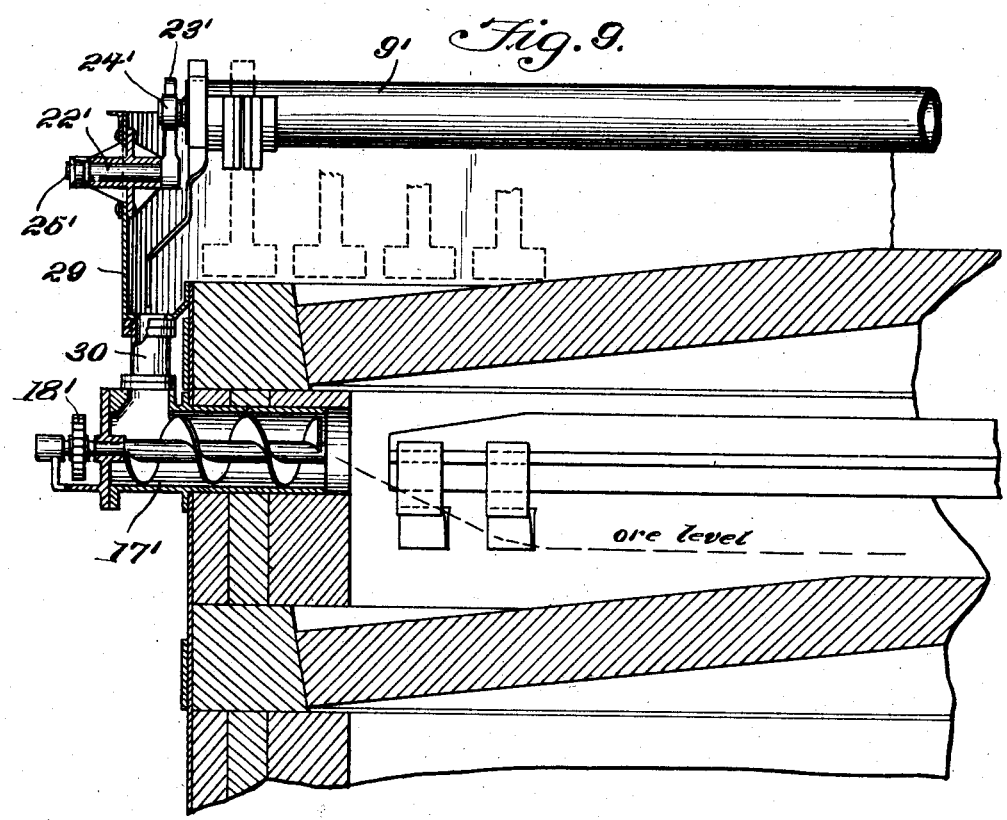
INVENTOR
Thomas A. Dickson
BY Spear, Middleton, Donaldson & Hall
ATTORNEY

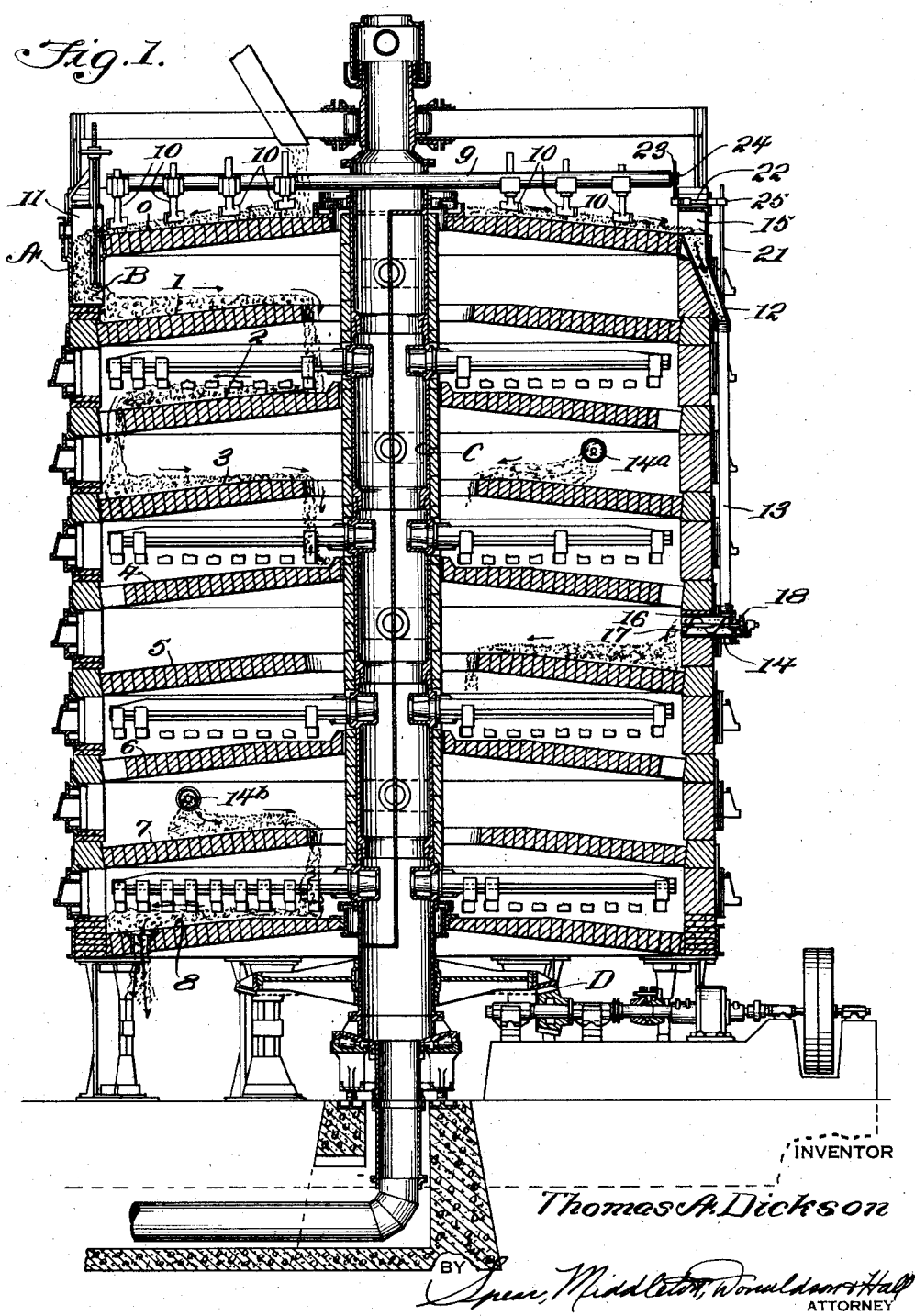

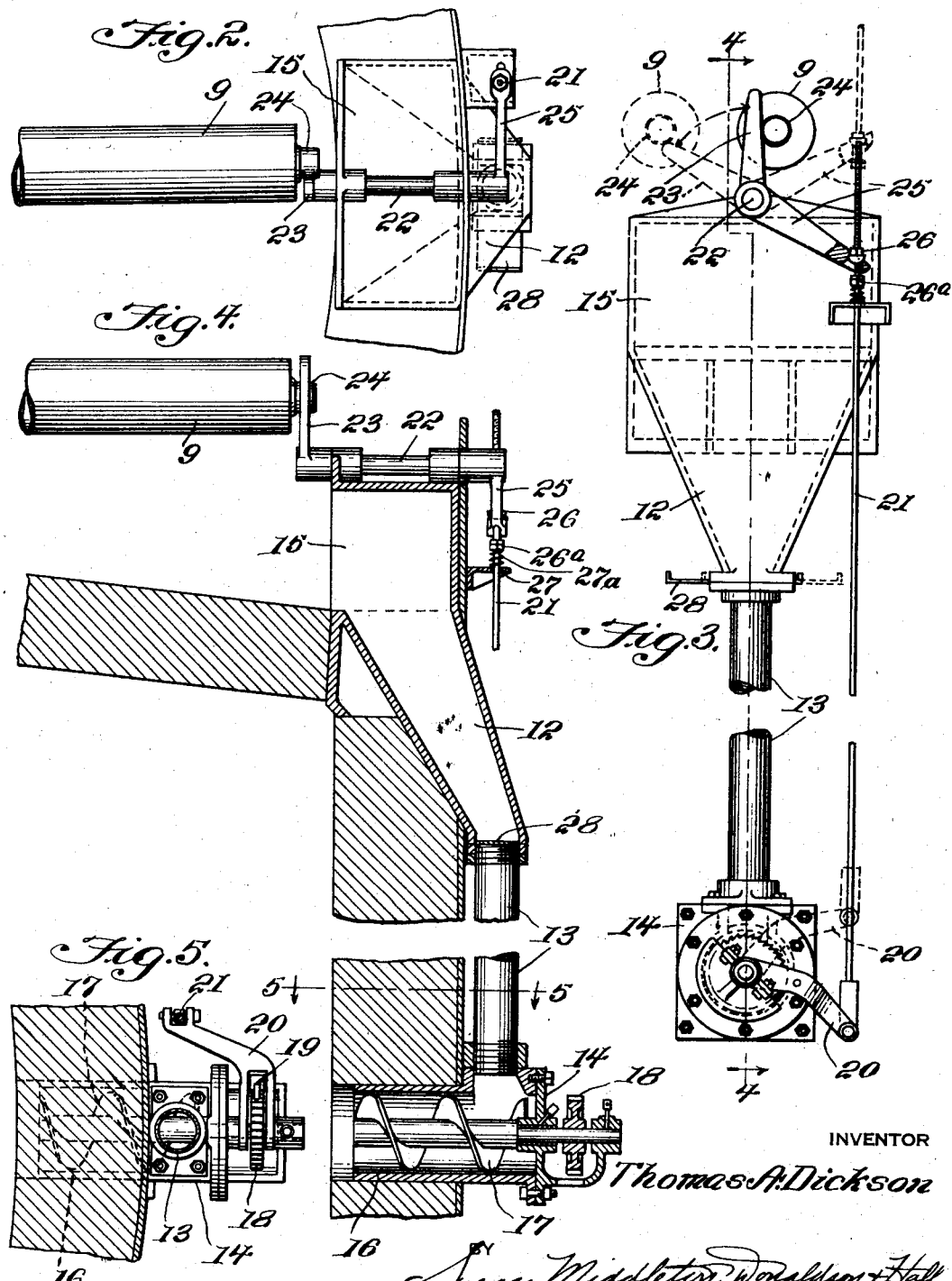

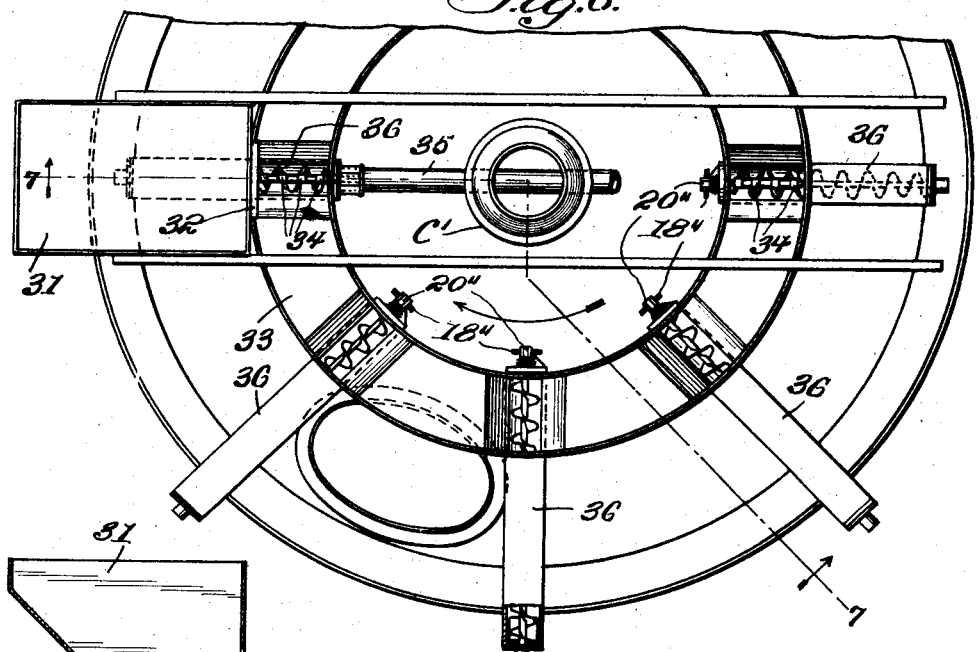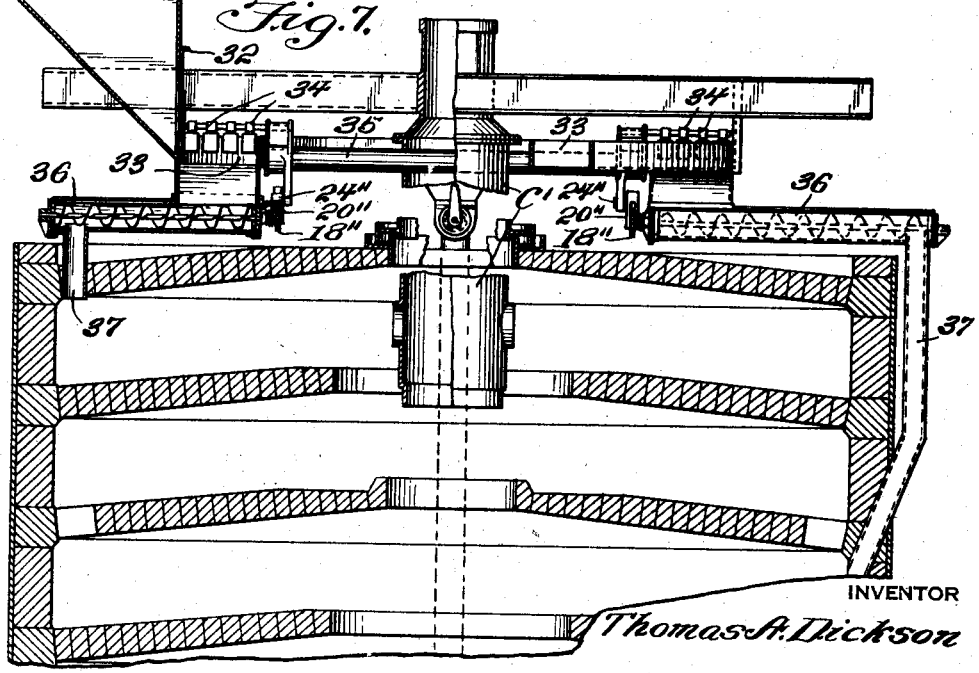

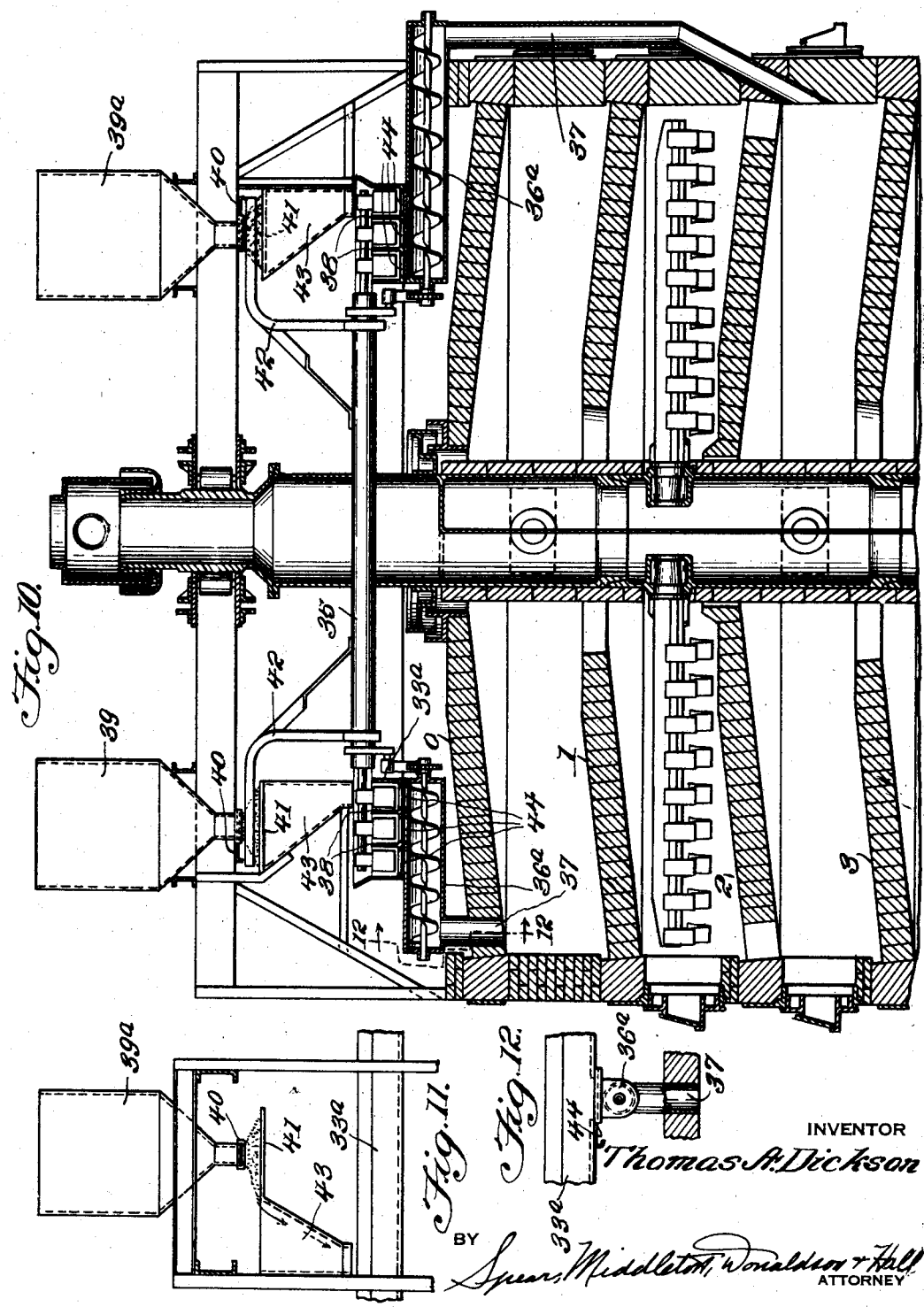

Patented June 30, 1931

1,811,920

UNITED STATES PATENT OFFICE

THOMAS A. DICKSON, OF DENVER, COLORADO, ASSIGNOR TO COLORADO IRON WORKS COMPANY, OF DENVER, COLORADO, A CORPORATION OF MAINE

METHOD AND APPARATUS FOR TREATING SOLIDS

Application filed February 6, 1928. Serial No. 252,230.

This invention relates to improvements in method and apparatus for the treatment of ores and the like.

More particularly, the invention concerns the subjection of ores or other materials to the action of air or other gases, and consists of an improved method and means of bringing the reacting substances into contact with each other under conditions which promote the maximum velocity of the desired reaction during practically the whole time of treatment while preventing the reaction rate from becoming excessive at any point, thereby securing greater efficiency and capacity and providing an improved method and means of control.

In carrying out the method of this invention, I preferably employ apparatus of the general type known as multiple hearth roasting furnaces in so far as the structure and rabbling means are concerned, but embodying new features through the use of which I accomplish improved results.

It is generally known in this art, that in the ordinary operation of apparatus of the kind indicated, the reaction does not commence until the conditions are favorable, that the reaction velocity accelerates rapidly when once started, and that the finish is slow and incomplete, the effect being that only a part of the apparatus is performing the maximum amount of work, the first and last of the hearths contributing relatively little.

Although the method and apparatus of this invention are generally applicable to the treatment of finely divided solids with gases, its operation in roasting zinc blende, in which the solid is zinc sulphide and the gas is oxygen of the air, is a typical example which I shall use to describe them.

In roasting zinc ores, the reaction does not commence until the temperature has been raised to the necessary degree, this heating being brought about when roasting without heat from extraneous sources, by the heat generated by the reaction, which is carried in the ascending gases to the upper hearths where counter-current roasting is carried out; or in cases where concurrent roasting is practised, by conducting a part of the gases from a hot hearth to the first hearth, or by providing heat from an extraneous source, as by the combustion of fuel.

Once started, the oxidation proceeds at a constantly accelerating rate, reaching a peak at about the middle of the furnace, after which it gradually slows down as the sulphur content is reduced with the result that a desirably low sulphur content of the calcines cannot be obtained. Moreover, in the middle of the furnace there is a large excess of heat. The roasting operation taken as a whole produces an abundance of heat which if developed in or conducted to those parts of the furnace where most needed would extend the effective roasting area, avoid the excessively hot middle zone, increase the capacity and improve the product with respect to remaining sulphur. It is to the improvement of these conditions that my invention is directed.

I am aware that efforts to this end have been made by others, who have by-passed certain hearths as to travel of ore or gas or both, or have provided means of reducing the temperature of certain hearths. Also that air for oxidation has been admitted at points other than at the bottom of the furnace, and that hot gases have been drawn from points other than the top of the furnace; but such efforts while mitigating conditions adverse to operation, fall short of accomplishing the results obtainable through my present invention as to capacity of a given hearth area, completeness of sulphur elimination, and ease of regulation.

I accomplish the improved results by feeding the ore continuously, in part to the first hearth and in part to one or more of the succeeding hearths, and I control the different feeds in amounts appropriate to the development of heat where heat is needed. Thus, I regulate the development of heat instead of controlling the hearth temperature by abstracting or adding heat, or transferring heat from one hearth to another. I also supply the oxidation air in appropriate amount at the points required, and this may be by admission or injection directly from without, or if heated air is desirable it may be admitted from the cooling air forced through the central shaft and arms as by suitable openings in the arms, or by conducting it from the cooling system through pipes and introducing it through the furnace wall at the points desired.

I feed the ore dry but not hot. Feeding hot ore through chutes entails difficulties arising from clogging and from reactions while in the chutes; and the chutes, for conservation of heat, would be within the furnace structure, whereas in feeding the ore cold I can place the chutes outside where they are readily accessible. Moreover, as my method consists in developing heat where needed, not in transferring heat developed in one place to another, preheating of the ore is unnecessary.

It is quite generally known that the sulphur remaining in roasted blende is not distributed uniformly throughout; but is almost all in the coarser portion, and in the centers of the larger particles. This is because the large particles require a longer time for oxidation than the small particles and before the reaction has reached the centers of the large particles the temperature has fallen below the reaction point, due to insufficient sulphur remaining in the whole to continue a sufficient evolution of heat.

In cases where the remaining sulphur in the coarse particles would otherwise be high, I may first screen the raw ore, separating it into two or more grades, and feed the coarsest to the uppermost hearth whereby it is caused to remain within the furnace for the maximum time and during part of the time under the most advantageous conditions, as the smaller quantity on the uppermost hearths and removal of fines which would cover the large particles provides better exposure to the oxidizing gases. On the other hand, the lowermost hearths being deficient in heat receive the finest grade, which will roast very rapidly and bring up the temperature so that oxidation continues practically up to the time of discharge.

My system of partial feeding, whether with preliminary sizing or not, will of itself greatly improve capacity and efficiency; but used in connection with the admission of air in properly regulated amount at suitable points, the entire furnace can be maintained in the most effective condition.

I may withdraw gases from any part of the furnace should it be desirable to do so, in which case the feeding of air and ore may be changed in amount and point of admission to correspond.

Having now generally described my process, I will proceed to a description of the apparatus and the manner in which my process may be carried out therein; but, although I show a multiple hearth furnace, it should be understood that the essential features of my improvements could with suitable modifications be applied more or less conveniently to other types without departing from the spirit of my invention.

Figure 1 is a vertical cross section of a multiple hearth furnace adapted to carry out my invention with the initial feed to the dryer hearth.

Fig. 2 is a plan view of the upper part of the feeding device. Fig. 3 is an elevation of the feeding device.

Fig. 4 is a section on line 4—4 of Fig. 3.
Fig. 5 is a section on line 5—5 of Fig. 4.
Fig. 6 is a plan of the top of a furnace modified with mechanism adapted to receive the initial feed in an annular distributing trough.

Fig. 7 is a section on the line 7—7 of Fig. 6.
Figs. 8 and 9 are respectively plan and section showing modified apparatus embodying an annular distributing trough outside the outer wall of the furnace.

Fig. 10 shows modified apparatus adapted to feeding different materials to different hearths.

Fig. 11 is a view of one of the receiving hoppers indicated at 39a in Fig. 10 taken at right angles to the view in Fig. 10.

Fig. 12 is a section on line 12—12 of Fig. 10.
I will now describe the operation of the apparatus shown in the drawings for carrying out my improved method in certain of its modifications.

Fig. 1 is a vertical transverse section of a multiple hearth roasting furnace having a drying hearth 0, and eight roasting hearths 1, 2, 3, 4, 5, 6, 7, 8, numbered in the order of their usual designation in American practice. It will be noted that the odd numbered hearths are "in" hearths and the even numbered hearths are "out" hearths.

As the exact type of furnace is not material to the operation of my invention, it need not be described in detail, however, I have shown an air cooled furnace having two rabble arms on each hearth, of which arms those on the odd numbered hearths are not shown as they project perpendicularly to the plane of the paper. A dryer hearth stirring arm 9, carries rabbles 10 which stir the bed of ore and gradually advance it toward the periphery of the hearth as the stirring arms are rotated through shaft C by the usual gear drive D or any suitable means.

Around the periphery of the furnace are feed boxes 11, through which a portion of the ore gains access to hearth number 1. These feed boxes are so designed that they are sealed against the escape of gases by the ore filling them as shown at A, each rabble arm as it passes only removing the ore which has flowed out of the lower opening B, this flow being replaced by ore settling down from above.

Also spaced around the periphery of the top of the furnace are a series of chutes 12, communicating by pipes 13 with the feeders 14. But one of these is shown in full, this leading to hearth 5, but others would lead to other hearths as indicated by 14a and 14b.

These feeding means may be made as shown in Figures 2, 3, 4, and 5, in which 15 is the receiving hopper, 13 the conducting pipes and 14 the feeders. There being no obstruction in the hopper 15 or pipe 13, they will be normally full of ore, and form seals against the escape of gases.

The feeders operate intermittently in the following manner. Each feeder comprises a hollow cylinder 16 with a helical conveying member 17 adapted to rotate therein. The helix is rotated by the ratchet 18 in connection with the pawl 19 and arm 20. To the arm 20 is attached the rod 21 which serves to operate it.

Movement is communicated to the rod 21 by the dryer hearth arm 9 in the following way. A rock shaft 22 is so located that an arm 23 on one end of it is adapted to be engaged by the end of the arm 9 which bears a wiper roller 24 in operative relation to the arm 23. On the outer end of the rock shaft 22 is an arm 25, forming with arm 23 a bell crank. The free end of arm 25 is adapted to slide on the rod 21, but the rod 21 is threaded and bears stop nuts 26 and 26a by the adjustment of which the sliding may be limited and the remaining movement of the end of arm 25 communicated to the rod 21 through which the ratchet is operated. At 27 is shown an apertured buffer member to retain and guide the end of the rod 21 in operative relation to the arm 25. A buffer spring 27a is provided between the member 27 and stop nut 26a.

In Figure 3 the arm 9 is assumed to be moving toward the left and to have just engaged the arm 23. Further movement would carry the arm to the left, to the position shown in dotted lines, the corresponding movement of arm 25 being indicated by like full and dotted lines. When the wiper 24 releases the arm 23 by passing beyond it, said arm 23 is returned to the upright position by the weight of rod 21 and its attached parts bearing on the free end of arm 25. The movement thus communicated to the ratchet 18 causes partial rotation of the helix 17 at each engagement of arm 9 with arm 23, and regulation of the quantity of ore fed is secured by adjustment of the positions of the stop nuts 26 and 26a.

Each hopper 15 is provided with a gate 28 by means of which the supply of ore to the pipe 13 may be partially or wholly shut off.

In the embodiment of the invention shown in Fig. 1 the ore is fed to "in" hearths; but I might, if desirable, feed it to "out" hearths, or to some "in" hearths and some "out" hearths. Means for supplying air are not shown, as the supply of air to different parts of a roasting furnace is commonly practised and means for doing it are well known in the art. Although I show a furnace having eight hearths, my invention is equally applicable to a furnace with any number of hearths.

Through the apparatus just described I am enabled to carry out my process in its simplest form by delivering ore by any of the well known means to the dryer hearth 0 near its center. Rotation of the arms 9 with the rabbles 10 which traverse this hearth gradually works the ore to the periphery and into the hoppers disposed about the furnace at that point. By the means described I am enabled to apportion the feed among the different hearths in such manner as to secure the most favorable roasting conditions through the greatest possible portion of the furnace, avoiding the great excesses of heat in certain hearths and deficiencies in others. For example with an eight-hearth furnace I would feed approximately 50% of the ore to the first hearth, 35% to the fifth hearth, and 15% to the seventh hearth; and with a ten-hearth furnace, about 40% to the first hearth, 30% to the fifth hearth, 20% to the seventh hearth, and 10% to the ninth hearth. These proportions are merely illustrative, and it should be understood that they would be fixed to suit the conditions when in operation and would be changed from time to time as the conditions changed, the introduction of ore being made where ore was needed and of air where air was needed to maintain the temperature and oxidizing conditions as nearly as possible within the limits necessary for the most effective results.

A modification of the apparatus for operating a furnace according to my method is shown in Figs. 8 and 9, in which the peripheral hoppers are replaced by a trough 29 encircling the dryer hearth, feed pipes 30 leading from the bottom of the trough to feeders 17', the feeders here shown being similar to and operated in the same manner as described and shown by Figures 2, 3, 4 and 5.

The stirrer arm 9' carries wiper roller 24' which is adapted to engage and move the trip arm 23' to cause corresponding movement of operating rod arm 25' on the end of rock shaft 22', which moves operating rod 21' vertically to operate ratchet 18' and helix feeder 17', all in the same manner as described with respect to Figs. 2, 3, 4, and 5.

Although I prefer not to feed hot ore, that is, not heated to near the roasting temperature, and as roaster operation is improved in most cases when drying is done in separate drying apparatus, the ordinary form of dryer hearth was shown in the apparatus above described to indicate a simple method of applying my improved feeding means to existing furnaces already equipped with dryer hearths. In Figures 6 and 7 I show a simple means of introducing ore to different hearths, wherein the feeders are placed above the top hearth of the furnace and it is not necessary to transmit any motion to the lower hearth levels at the points of introduction of the ore because the ore drops by gravity through the chute 37 directly into the furnace.

In Figures 6 and 7, 31 is a hopper into which the ore is delivered and 32 is a gate for regulating the escape of the ore from its bottom. 33 is an annular trough into which the ore flows from the hopper 31, and 34 a series of rabbles attached to the arm 35 which is mounted on the central shaft C' and revolves as the shaft rotates, thereby distributing the ore evenly in the trough. Placed beneath the trough and communicating with it by suitable openings in its bottom, are feeder conveyors 36 operated in a similar manner to those described and shown in Figures 2, 3, 4 and 5 through ratchet 18'', ratchet arm 20'' and wiper roller 24'' carried by stirrer arm 35. These convey the ore outwardly and discharge it into down spouts 37, the lower ends of which enter the various hearths to which it is desired to feed ore. This arrangement provides every facility for regulation of the ore feed to different hearths as already described, the seals against the escape of gas being the conveyors 36 which are covered and are full of ore when in operation.

When the ore contains relatively coarse particles which tend to retain sulphur, or when the ore treated comes from different sources and some of it roasts more slowly than the rest, I feed such coarse particles or such difficultly roasted portion to the first hearth. By so doing, these portions of the ore not only are exposed to roasting conditions for the longest possible time, but while on the upper hearths they are better exposed to oxidization as the bed of ore on these hearths is thinner. When the range of sizes of the ore particles is wide enough to warrant it, and this is often the case, it should be first separated into two or more portions as by screening.

The apparatus for operating a roaster by this modification of my method is shown in Figs. 10, 11 and 12. The essential features of this apparatus are the same as in Figs. 6 and 7; but the annular trough 33a is divided by partitions 38 so as to form a series of concentric troughs (here shown as three in number).

The ore to be roasted is delivered to hoppers 39, 39a, there being one of these hoppers for each kind of ore. A gate 40 controls the discharge which flows out upon a horizontal plate 41 located a short distance below it, the ore spreading out upon this plate in the form of a cone the dimensions of which will depend upon the size of the opening 40, the vertical distance between the opening and the plate, and the angle of repose of the ore. The arm 35, in addition to the rabbles, carries scrapers 42 adapted to pass between the bottom of the hopper 39 and the plate 41, so that as it rotates it will push a part of the cone of ore off the plate, the ore so removed being replaced by flowage from the hopper 39, 39a, after the arm has passed.

Adjoining each of the feed plates 41 is a hopper 43 sufficiently large at the top to receive the ore discharged from the plate 41, and small enough at the bottom to confine its discharge to its particular trough.

The ore from the troughs passes through openings into the conveyor feeders 36a, and these conveyors preferably extend under and communicate with all of the troughs, a gate 44 being placed in the opening in each trough so that a deficiency of feed for any hearth can be made up by permitting ore from another trough to enter the appropriate conveyor feeders.

I claim:

1. In a process of roasting or the like wherein the solids are caused to traverse enclosed spaces, the method of feeding the solids graded from coarse to fine successively into the line of traverse and at successive points therealong whereby the coarse solids are subjected to roasting conditions for a longer time than the fine.

2. In a process of subjecting solids to the action of gases in which the solids are caused to progress through an atmosphere of the gas within an enclosed space, the method consisting in feeding a portion of the solids into one end of the enclosed space, feeding other portion or portions through means sealed against the escape of said gas and into the enclosed space at succeeding points along the line of progress of the first portion, and discharging the combined portions from the apparatus.

3. In a process of roasting or the like wherein the solids are caused to traverse an enclosed space, the feeding of the solids to the enclosed space at successive points therealong in the decreasing order of their resistance to the desired reaction, the solids of lesser resistance being fed nearer the exit end of the enclosed space.

4. In apparatus of the class described having an enclosed space with means for progressing solids therethrough, means without said space adapted to introduce solids into said space at various points intermediate the ends thereof, said means including a trough encircling the upper end of said enclosed space, means for feeding solids to said trough, feed pipes extending from the bottom of said trough one to each of said various points, and feeders at said points connected to said feed pipes and communicating with said enclosed space while sealing the communicating opening against the escape of gas from said enclosed space.

5. Apparatus according to claim 4 in which said means for feeding solids to said trough includes a dryer hearth to which solids are delivered, a stirring arm having rabbles adapted to rotate to stir the solids and advance them gradually to the periphery of the hearth and into said trough, means for rotating said arm, and means connected to said feeders to be intermittently actuated by said rabble arm in its rotation to intermittently feed the solids into the enclosed space, said feeders being rotary, and said intermittently actuated means for each feeder including a rock shaft having a bell crank, one arm of which is to be engaged by a wiper roller on said rabble arm, a rod slidably connected to the other arm of said bell crank but having adjustable abutments to limit relative sliding movement and to cause said bell crank to move said rod, and pawl and ratchet connection means between said rod and said rotary feeder to intermittently actuate the feeder upon movement of the rod.

In testimony whereof I affix my signature.

THOMAS A. DICKSON.